July 17, 1951 J. G. DRANE 2,560,852
ELECTRIC PRESSURE GAUGE
Filed April 18, 1947 2 Sheets-Sheet 1
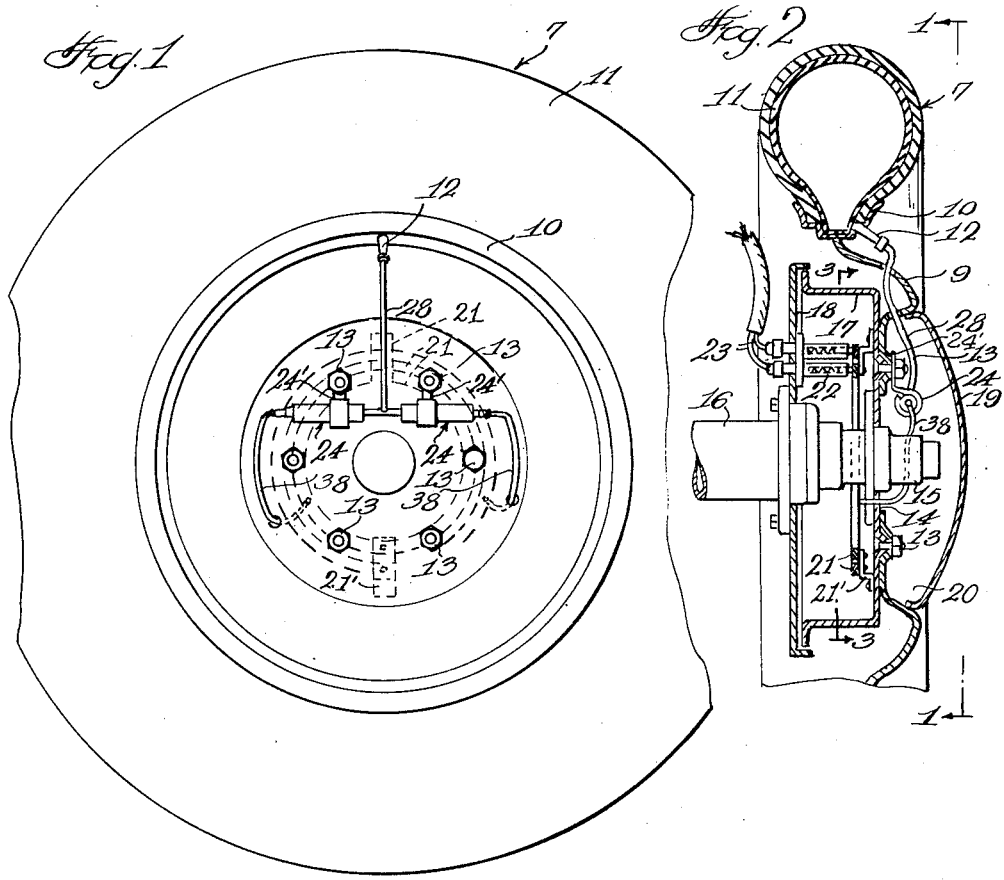
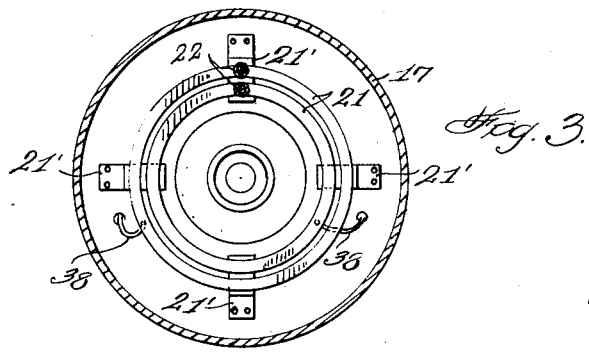
Inventor
John G. Drane
By Randolph & Beavers
Attorneys July 17, 1951 J. G. DRANE 2,560,852
ELECTRIC PRESSURE GAUGE
Filed April 18, 1947 2 Sheets-Sheet 2

Inventor
John G Drane
By Randolph & Beavers
Attorneys

Patented July 17, 1951

2,560,852

UNITED STATES PATENT OFFICE 2,560,852

ELECTRIC PRESSURE GAUGE

John G. Drane, Tempe, Ariz.

Application April 18, 1947, Serial No. 742,376

2 Claims. (Cl. 201—48)

This invention relates to improvements in electric pressure gauges of the type involving electrical means for indicating or signalling the attainment or occurrence of predetermined maximum and/or minimum fluid pressures within a container, and/or for showing the amount of pressure present in the container in terms of units of pressure.

A primary object of the invention is to provide a simpler, more stable, and more reliable gauge of the type indicated above, which, while especially suitable for general use where the reading dials are located at substantially great distances from the container or containers whose internal pressures are to be gauged, is also eminently suitable, because of its stability, ruggedness, and compactness, for such uses as the gauging of the pressure of pneumatic tires on the individual wheels of automotive and other vehicles.

Another primary object of this invention is to provide a pressure gauge of the character indicated abve wherein the electrically operated reading dials and/or signals are actuated by electric current controlled by rheostat means which are subjected immediately or directly to the pressure to be gauged, and which are devoid of moving parts or mechanical movements in the ordinary sense of these terms, so that wear and need for adjustment are eliminated or reduced to a minimum, as well as damage resulting from jarring or other changes in position.

A further primary object of this invention is to provide a pressure gauge of the character indicated above in which the changes in electric current for operating the reading dials and/or signals are produced by changes in container pressure applied directly upon carbon disk or metal disk rheostat means.

Other important objects and advantageous features of this invention will be apparent from the following detailed description and accompanying drawings, wherein, merely for purposes of disclosure, a specific embodiment of this invention is set forth.

In the drawings:

Figure 1 is a fragmentary outboard side elevation of the pneumatic tired wheel of an automotive vehicle, showing pressure responsive rheostat means in accordance with the present invention applied thereto for the operation of a reading gauge and a low pressure signal on the vehicle.

Figure 2 is a fragmentary transverse vertical section taken substantially centrally through Figure 1.

Figure 3 is a vertical transverse section taken through Figure 2 on the line 3—3.

Figures 4, 5:
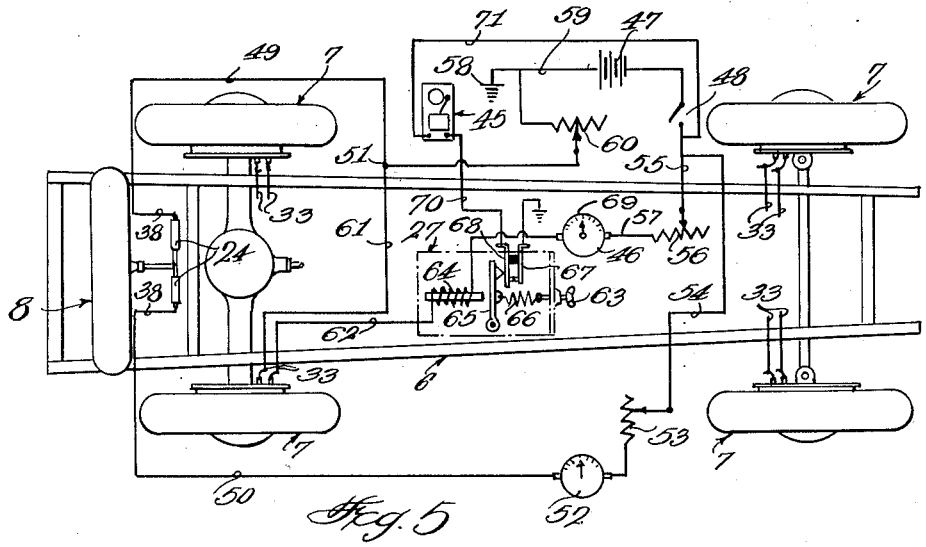
Figure 4 is an enlarged fragmentary section taken longitudinally through a dual rheostat unit operatively connected to the valve stem of a vehicle wheel tire.
Figure 5 is a wiring diagram showing the electrical connections between the dual rheostat units of the several vehicle wheels and the corresponding tire pressure reading dials and low-pressure warning signals.

Although the specific embodiment disclosed herein concerns automotive vehicles in particular, it will be apparent therefrom that the individual or collective pressure responsive dual rheostat units can be readily mounted relative to and operatively connected to pressure containers other than pneumatic tires and that the units will operate similarly in other applications when electrically associated with the relay means and reading dials and signals actuated thereby.

Referring in detail to the drawings, the numeral 6 generally designates the chassis or frame of an automobile having the ground engaging wheels 7, and the spare wheel 8. Each wheel involves in the usual way, as shown in Figure 2, a disk 9 having a channel rim 10 in which is mounted the pneumatic tire 11 with its valve stem 12 projecting through the rim 10 toward the outboard side of the wheel. The similar spare wheel 8 is usually mounted on support means (not shown) on some suitable place on the vehicle 6.

The ground engaging wheels 7 are mounted by means of bolts 13 to hub elements 14, which are journalled on elements 15 of stationary axle elements 16, and include brake drums 17 which are protectively closed at their inboard sides by disks or shields 18 fixed to the stationary axle elements 16. Hub caps 19 may be present to enclose central recesses 20 in the wheels.

A pair of concentrically spaced slip rings 21 are fixed to the inboard side of the hub element 14 concentrically within the brake drum 17 on insulated brackets 21', with the rings insulated from each other. A pair of spring pressed carbon or other suitable brushes 22 are fixedly mounted on the brake drum shield 18 to engage the slip rings, these brushes being insulated from the shield 18 and from each other and having individual insulated wires 23 leading therefrom.

The dual rheostat unit of each wheel consists, as shown in Figure 4, of two preferably axially spaced and aligned metal on other suitable material cylinders 24, having ears 24' for the bolts 13, and whose inner ends are closed except for nipples 25 into which are threaded the opposite ends of a T-fitting 26, whose standard portion 27 is connected by a suitable tube 28 to the pneumatic tire valve stem 12 by a threaded cap 29 including an element 30 designed to hold the valve pin 31 in open position, so that the air pressure within the tire is constantly exerted through the tube 28, and consequently in both arms of the T-fitting 26.

The open outer ends of the cylinders 24 are closed by threaded caps 32 which hold the rheostat in place and can be removed to permit access to the interior of the cylinders for inspection or replacement of the rheostat elements.

Each rheostat component comprises a dielectric or insulated material open ended cylinder 34 fitted within the outer cylinder 24, or integral therewith in the event of making the cylinders of plastic material, with the cap 32 retainably engaging the outer end thereof through the intermediacy of a rubber disk 35 including a grommet portion 36 projecting outwardly through an opening provided in the cap 29. A metal or other suitable conductive material disk 37 engaging the inner side of the rubber disk 35 has a conductor 38 leading therefrom and through the grommet 36 and making electrical connection with one of the slip rings 21.

Adjacent to the inner end of the cylinder is a flexible diaphragm 39 having a conductive portion to which is electrically connected a conductor 40, which leads through the cross head of the T-fitting 26 to electrically connect the diaphragms of the two rheostat elements together. The conductor 40 has sufficient flexibility or slack therein to permit independent movement of the diaphragms 39. The diaphragms are spaced by annuli 41 from the inner ends of the cylinders 24 in order to define pressure chambers 42 whereby substantially the entire surfaces of the diaphragms are equally affected by the air pressure passing through the T-fitting 26.

Between the conductive portions of the diaphragms 39 and the conductive disks 37 are arranged a pile or plurality of carbon disks 43, which when not subjected to substantial pressure operating through the diaphragms are held in lightly touching relation between the diaphragms 39 and disks 37, wherein they present substantial resistance to the passage of an electric current between the diaphragms and the disks 37. Metal disks may be substituted for the carbon disks 43 in applications of the invention which involve heavy pressures, such as above 180 pounds per square inch, which might be damaging to the carbon disks 37 when heavily and closely compressed together by a heavy pressure acting through the T-fitting 26 against the diaphragms 39. As is well known, the greater the compression of the disks 37 together, the less the resistance that is offered to the passage of an electric current therethrough. In the case of the present invention, the degree of compression of the disks 37 determines and produces pressure readings on dials corresponding to the air pressures within the tires 11, and similarly determines the actuation of a warning signal in the event of pressure in a tire subsiding below a predetermined minimum. An overpressure alarm signal can obviously be provided for in similar manner.

The electrically operated under or over-pressure alarm signal may be in any suitable form, such as a bell or buzzer 45, and for a pressure reading dial an ammeter type gauge 46 may be used, with its dial graduated in units of pressure, these devices being preferably mounted conveniently within the driving compartment of the vehicle. In order that the driver may not forget to place the system in operation, the operating circuit, powered by the vehicle battery 47 is connected to the ignition switch 48, so that the system will be turned on whenever the ignition switch is turned on.

In Figure 5, for the sake of clarity and ease of understanding, the rheostat units of the spare wheel 8, and of only one ground engaging wheel 7 are shown. However, it will be evident to persons familiar with the art how the circuits of all of the ground engaging wheels 7 can be connected to operate from the battery 47. In the case of the spare wheel 8 no slip rings 21 and brushes 22 are necessary or desirable, and the necessary electrical connections are made directly to the rheostat components through their wires 38.

As shown in Figure 5, the spare wheel rheostat unit wires 38 are separately connected to wires 49 and 50, the wire 49 connecting with a junction 51 and the wire 50 connecting with one side of a pressure calibrated ammeter 52, whose opposite side is connected to one side of a calibrating rheostat 53, which is adjustable to balance the resistances of the various circuits.

The rheostat 53 is connected by the wire 54 with the wire 55 which leads from one side of the ignition switch 48 to another balancing rheostat 56, which is connected by wire 57 with the pressure calibrated full scale deflection ammeter 46. The other side of the ignition switch 48 is connected to the vehicle battery 47 which is grounded at 58 by wire 59.

The battery 47 is connected to the heretofore mentioned junction 51 by another balancing rheostat 60, whereby the battery is in circuit with the rheostat unit of the spare wheel 8 through the wires 49 and 50, and with the rheostat unit of the ground engaging wheel 7 through a wire 61 which leads from the junction 51 to one of the wires 23 leading from the brushes 22 in contact with the slip rings 21 which are connected by wires 38 with the wheel rheostats. The battery circuit to the ground engaging wheel rheostat unit is completed through the remaining wire 33 which is connected by a wire 62 to the relay switch 63.

The relay switch 63 may suitably comprise an electromagnet 64 having the wire 62 connected to one end of its coil winding with the opposite end thereof connected to the side of the pressure calibrated ammeter 46 opposite its connection with the balancing rheostat 56. The magnet is arranged to attract a movable armature 65 which is normally yieldably held in an opposite direction by a spring 66 and in such a position as to keep a pair of spring separated contacts 67, 68 engaged, so that these contacts will open whenever the magnet is sufficiently energized to pull the armature over against the resistance of the spring 66. The contact 67 is grounded as indicated at 69 while the contact 68 is connected by a wire 70 with one side of the alarm 45, whose opposite side is connected by the wire 71 with the battery wire 55, beyond the ignition switch 48.

With the ignition switch 48 turned on and the tire pressure at or above the predetermined minimum the related rheostat unit disks 43 will be compressed together to a degree permitting passage therethrough of sufficient current to cause the electromagnet 64 to pull the armature 65 and permit the contacts 67, 68 to remain open, thereby opening the battery circuit to the alarm 45. However, should the tire pressure drop below the predetermined level, thereby correspondingly reducing the compression of the wheel rheostat disks 43, the electromagnet 64 will not be sufficiently energized to draw and hold the armature 65 against the pull of the spring 66, with the result that the contacts 67, 68 will close and operate the alarm 45, thereby warning the driver of the vehicle of an underinflated condition of any tire or tires on the vehicle.

Since the circuit through the winding of the electromagnet 64 is not opened by opening of the contacts 67, 68, the pressure calibrated ammeter and dials 46 and 52 are constantly in operation as long as the ignition switch 48 is turned on. The pressure readings of these dials depend upon the degree of compression of the wheel rheostat disks 43 corresponding to the air pressure within the related tire 11, and with the balancing rheostats 53, 56 and 60 properly adjusted, these pressure readings will accurately show the actual air pressure in the tires 11.

I claim as my invention:

1. In an apparatus of the character described, a pressure pick up comprising, in combination with a tire having a valve stem, a pair of housings, a rheostat mounted in each of the housings, a nipple at the inner end of each of the housings, a T-fitting interconnecting the nipples and the valve stem, a flexible diaphragm at the inner end of each rheostat, a wire extending through the fitting and interconnecting the diaphragms, a disc of conductive material at the outer end of each rheostat, and a wire connected to each of said discs and extending through the outer end of its housing, said last mentioned wires adapted to be connected with a source of electrical energy and suitable circuits to operate a pressure indicator and signal devices.

2. In an apparatus of the character described, a pressure pick up comprising, in combination with a tire having a valve stem, a pair of cylindrical housings, a carbon pile rheostat comprising a plurality of carbon discs arranged in insulated condition in each of the housings, a nipple at the inner end of each of the housings, a T-fitting interconnecting the nipples and the valve stem, a flexible valve stem at the inner end of each rheostat, a wire extending through the fitting and interconnecting the diaphragms, a disc of conductive material at the outer end of each rheostat, and a wire connected to each of said discs and extending through the outer end of its housing, said last mentioned wires adapted to be connected with a source of electrical energy and suitable circuits to operate a pressure indicator and signal devices.

JOHN G. DRANE.

REFERENCES CITED

The following references are of record in the file of this patent:

UNITED STATES PATENTS

| Number | Name | Date |
| --- | --- | --- |
| 1,335,238 | Hopkins | Mar. 30, 1920 |
| 1,581,320 | Pumphrey, Jr. | Apr. 20, 1926 |
| 2,033,424 | Gieskieng | Mar. 10, 1936 |
| 2,270,148 | Stowe | Jan. 13, 1942 |